Aug. 7, 1945.  A. SCHULTZ ET AL  2,381,005
FARM IMPLEMENT
Filed Aug. 22, 1944  3 Sheets-Sheet 1
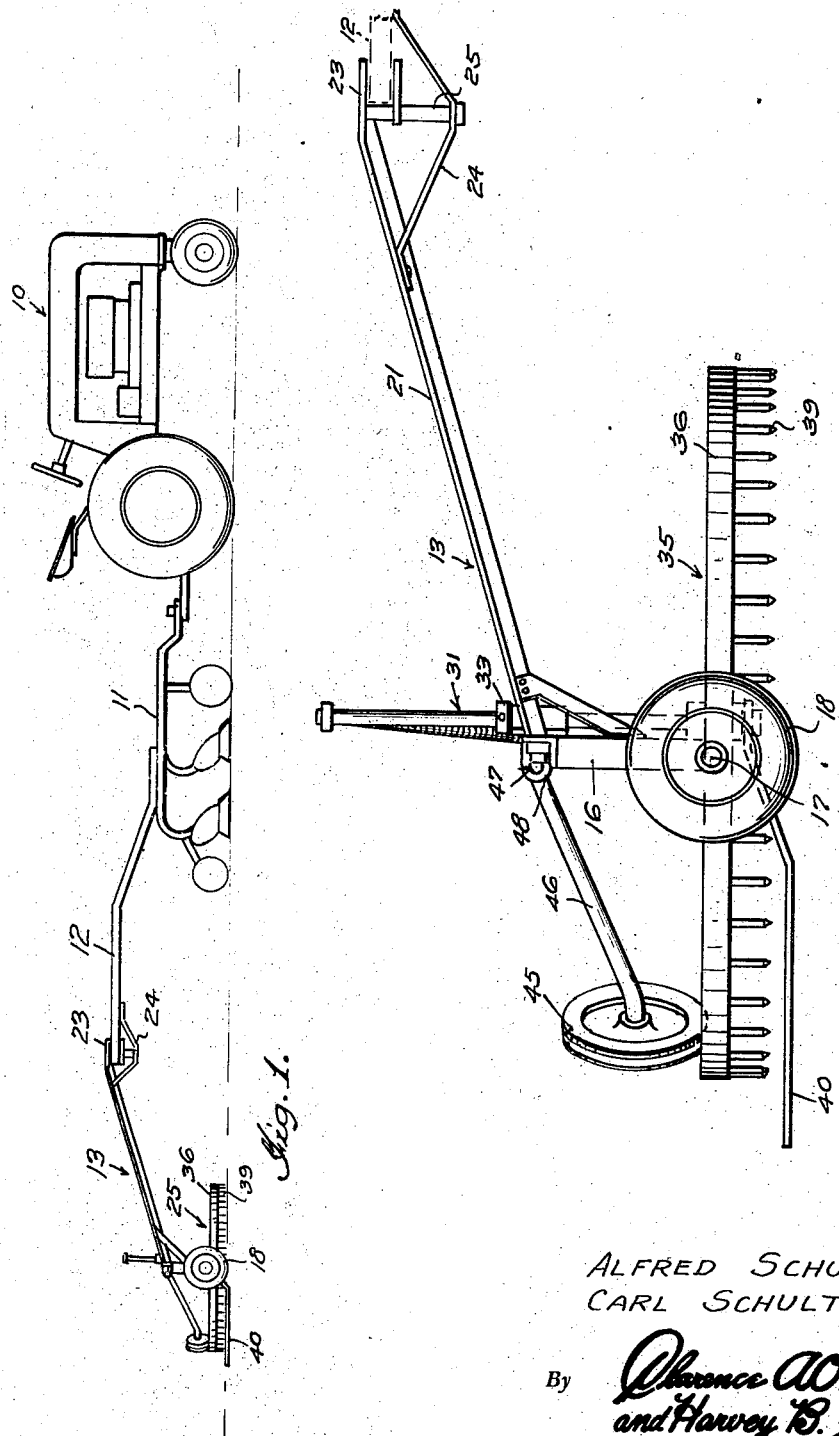
Inventor
ALFRED SCHULTZ,
CARL SCHULTZ,
By Clarence A. O'Brien
and Harvey B. Jacobson
Attorneys Aug. 7, 1945. A. SCHULTZ ET AL 2,381,005
FARM IMPLEMENT
Filed Aug. 22, 1944 3 Sheets-Sheet 2

Inventors
ALFRED SCHULTZ,
CARL SCHULTZ,

Aug. 7, 1945. A. SCHULTZ ET AL 2,381,005
FARM IMPLEMENT
Filed Aug. 22, 1944 3 Sheets-Sheet 3

Inventors
ALFRED SCHULTZ,
CARL SCHULTZ,
By Clarence A. O'Brien
and Harvey B. Jacobson
Attorneys

UNITED STATES PATENT OFFICE 2,381,005

FARM IMPLEMENT

Alfred Schultz and Carl Schultz, Upham, N. Dak.

Application August 22, 1944, Serial No. 550,596

1 Claim. (Cl. 55—13)

This invention relates to a farm implement and more particularly to a rotary straw spreader or similar device.

A primary object of this invention is the provision of an improved rotary straw spreader adapted to rake or remove straw from stubble fields onto a plowed section of the said field during the course of the plowing operation.

An additional object is the provision of such an apparatus providing means to mulch the land and prevent soil erosion.

A still further object is the provision of such a device which may be operated in conjunction with the conventional plow and at the same time has the plowing operation.

A still further object is the provision of such a device which when towed by a tractor or the like will be substantially self-operating and the raking effect thereof will be accomplished substantially automatically by the mere towing of the device.

Still another object is the provision in such a device of means whereby the falling of the raked or gathered straw into the furrow of the plow is precluded.

A more specific object is the provision in such a device of means normally biasing the rotary raking member in a direction toward the straw or stubble to be raked onto the plowed field.

Still further objects will in part be obvious and in part be pointed out as the description of the invention proceeds and disclosed in the accompanying drawings, wherein there is shown a preferred form of this inventive concept.

In the drawings:

Figure 1 is a side elevational view of one form of device embodying this invention, in association with a plow and tractor for pulling the same.

Figure 2 is an enlarged side elevational view of a device such as shown in Figure 1.

Similar reference characters refer to similar parts throughout the several views of the drawings.

Figure 3:
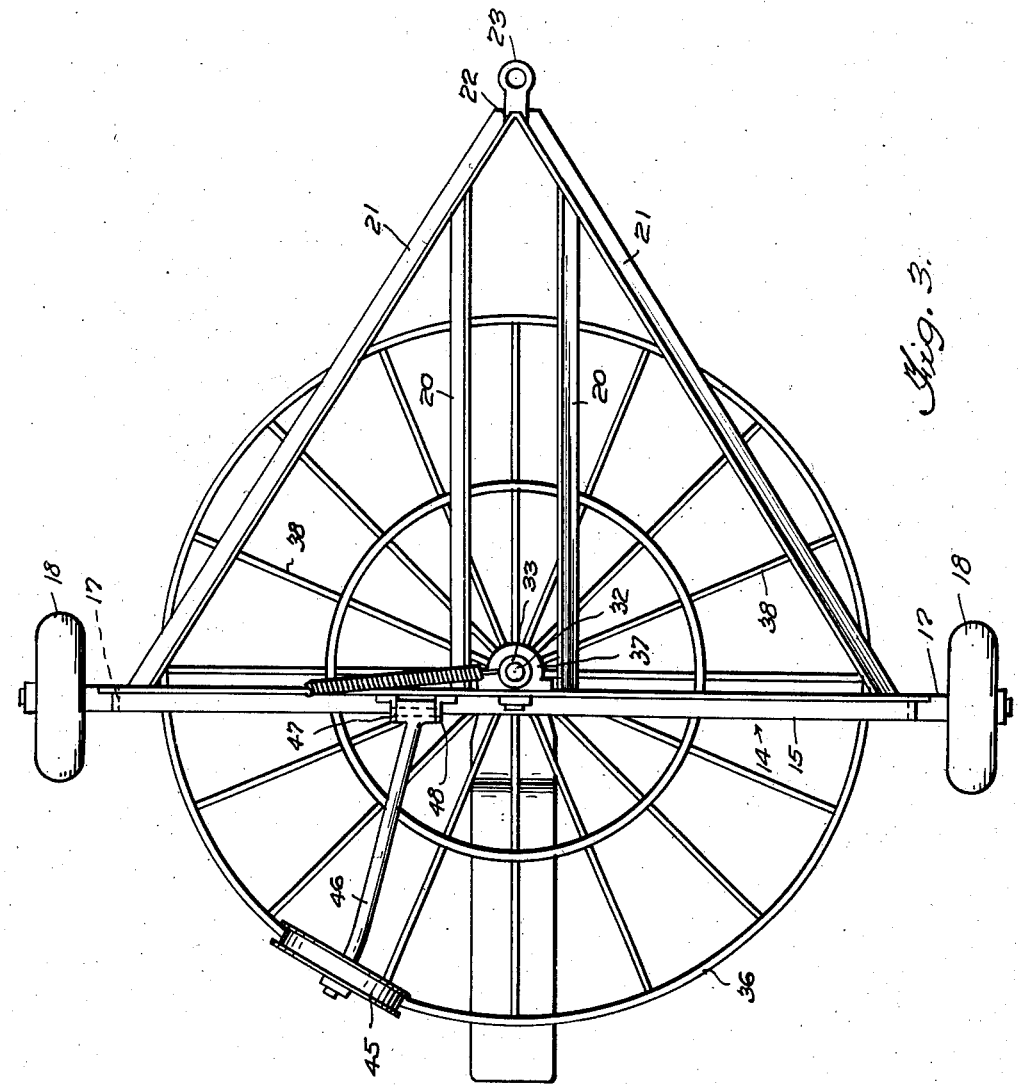
Figure 3 is a top plan view of the device shown in Figure 2.
Figure 4:
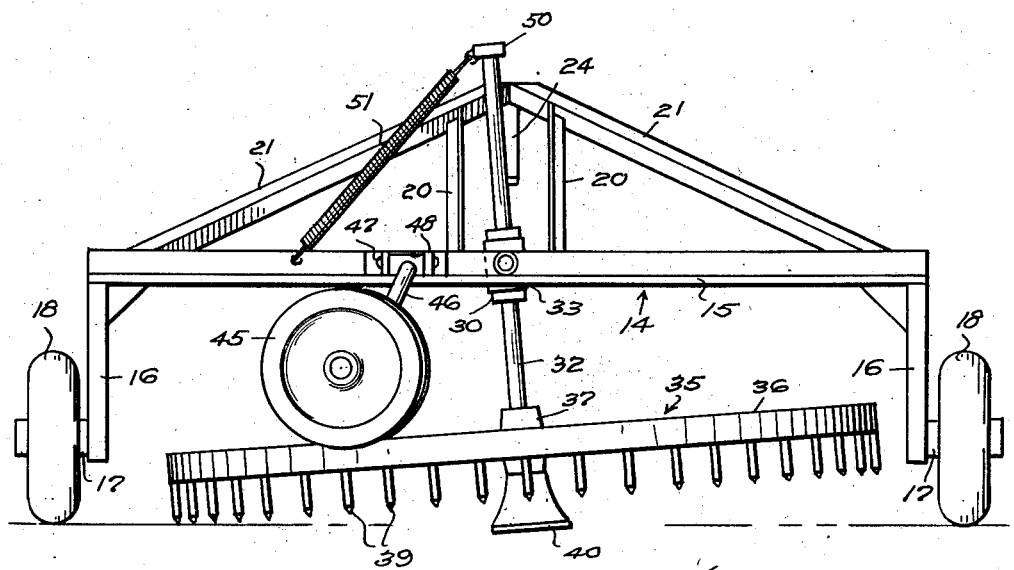
Figure 4 is an enlarged elevational view of the device in Figures 2 and 3 as viewed from the rear.
Figure 5:
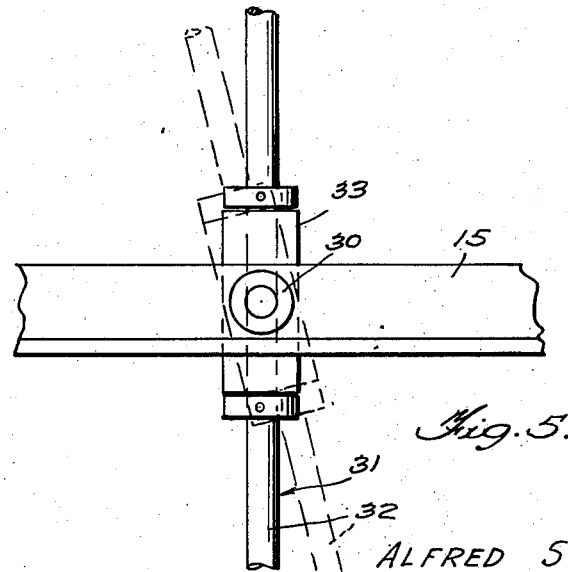
Figure 5 is an enlarged detail view showing certain parts of the operating mechanism in different position of adjustment, as by dotted lines.

Having reference now to the drawings there is generally indicated at 10 a tractor or similar source of motive power of any desired type to which is secured a plow 11, likewise of conventional design, provided with plow handles 12, or a corresponding towing rig to which is adapted to be attached the device comprising this inventive concept, generally indicated at 13. In general terms the device 13 is comprised of a U-shaped frame generally indicated at 14 including a transverse member 15 and downwardly extending members 16, to which are secured axles 17 on which are mounted wheels 18, by means of which the frame and its associated mechanism is adapted to be supported. Extending forwardly from transverse frame member 15 are a pair of elongated members 20 and a pair of angularly disposed similar members, comprised of angle iron or the like, 21 terminating at the point 22 at which point is affixed a towing hook 23. Extending members 20 have secured to the lower portion thereof bracket-like members 24 having an aperture passed through the lower portion thereof through which aperture and a suitable aperture in towing hook 23 extends a locking pin 25 adapted to engage the member 12, secured to the plow 11. Pivotally secured to transverse member 13 as on a pivot 30 is a vertical member 31, comprised of a rotatable rod or axle 32 engaged in a sleeve 33 secured to the pivot pin 30. Rod 32 has secured to the lower extremity thereof in a manner for rotation thereabout, a wheel generally indicated at 35 comprised of a rim 36, a hub 37, a plurality of spokes 38, and a plurality of projecting teeth 39 depending downwardly from the rim. Likewise secured to rod 32 at a lower extremity thereof below wheel 35 is a follower 40 adapted to extend rearwardly beyond the extent of the diameter of the wheel and being of a width or thickness sufficient to fill a furrow created by plow 11. A follower wheel 45 mounted upon an axle 46 secured as by a pivot 47 in a sleeve 48 secured to transverse frame member 15 is adapted to ride upon one side of rim 36 in order to hold that side of the wheel relatively adjacent the ground. Pivotal movement of the wheel 45 is permitted in order that any roughened portions or bumps in the ground may be accommodated without disruption of the apparatus. The upper portion of rod 32 which extends above frame 15 terminates in a cap 50 to which is secured one end of a coiled spring 51, the other end thereof being suitably secured to a point on transverse frame member 15 exteriorly of the pivotal junction of axle 46 therewith, the spring normally serving to bias rod 32 about pivot 30 in such manner as to raise the side of the wheel opposite follower wheel 45 a distance above the surface of the ground.

It will be understood that dimensions of the apparatus may be readily adjusted to suit varying conditions, it being pointed out that in the preferred embodiment of the invention the diameter of the wheel structure 35 is preferably at least twice the width of the plow 11. From the foregoing, the operation of the device should now be readily understandable. As the plow 11 is towed by tractor 10, suitable furrows in a stubble field or the like are provided. Plow 11, in turn, tows rotary straw spreader 13, the teeth 39 on the side of the wheel 35 adjacent follower wheel 45 engaging with the ground and sweeping the straw rearwardly, due to the rotation of the wheel effected by engagement of the teeth with the ground until the same is on the other side of the plow and furrow, that is to say, the region of ground previously plowed on the last trip of the plow. During such operation follower 40 precludes any straw or stubble falling into the furrow in the course of plowing at the particular time, thus precluding the coverage or burying of any stubble when the next adjacent row is turned over.

From the foregoing it will now be seen that there is herein provided an improved self-propelled rotary straw spreader, which will be reliable and efficient in operation, sturdy and durable in construction, and relatively simple and inexpensive to manufacture and operate.

As many embodiments may be made of this inventive concept, and as many modifications may be made in the embodiment hereinbefore shown and described, it is to be understood that all matter herein is to be interpreted merely as illustrative and not in a limiting sense.

We claim:

In a device of the character described, in combination, a frame, including a transverse member wheels carried by and supporting said frame, a horizontally positioned rotatable member, mounted on an axle, carried by a pivot positioned at substantially the mid-point of said transverse member, said axle extending above said transverse member, and means to engage a portion of said member with the ground on one side of said frame to effect a raking action, said last-mentioned means including a follower wheel rotatable on the rim of said member, and pivotally secured to said frame, and a spring extending between the upper extremity of said axle above its pivot point and an off center portion of said transverse member normally biasing said rotatable member at an angle so that one portion thereof extends toward engagement with the ground.

ALFRED SCHULTZ.
CARL SCHULTZ.